Jan. 19, 1926.    1,570,300

E. GASE

WEIGHING MACHINE FOR LIQUIDS

Filed Jan. 28, 1924    4 Sheets-Sheet 1

INVENTOR
Eugene Gase
BY
Newell and Spencer
ATTORNEYS

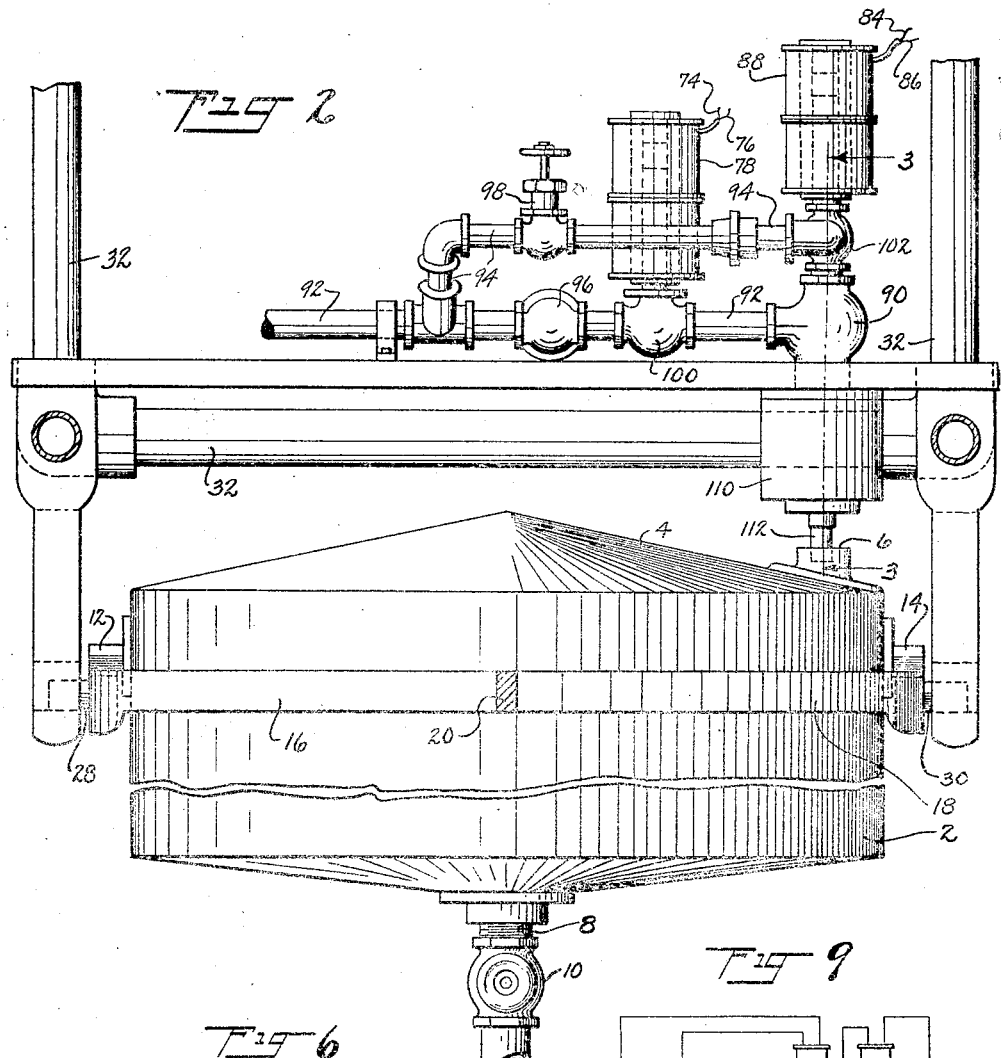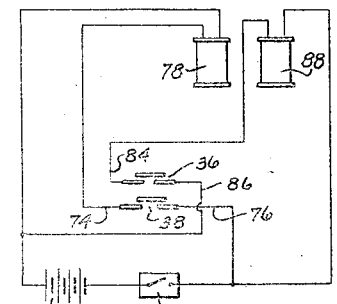

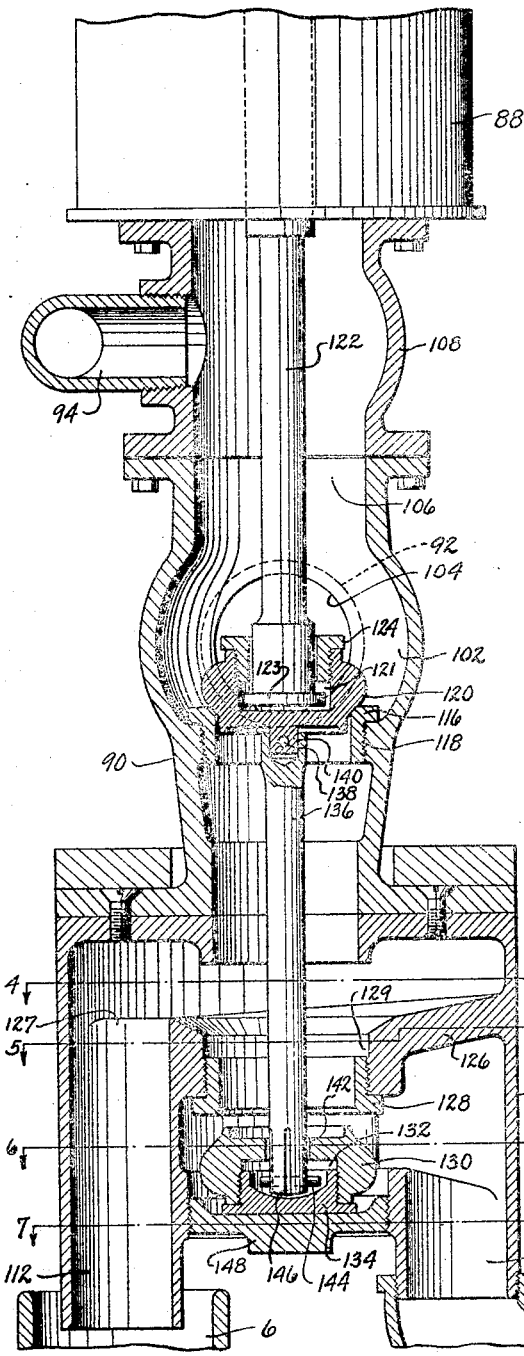

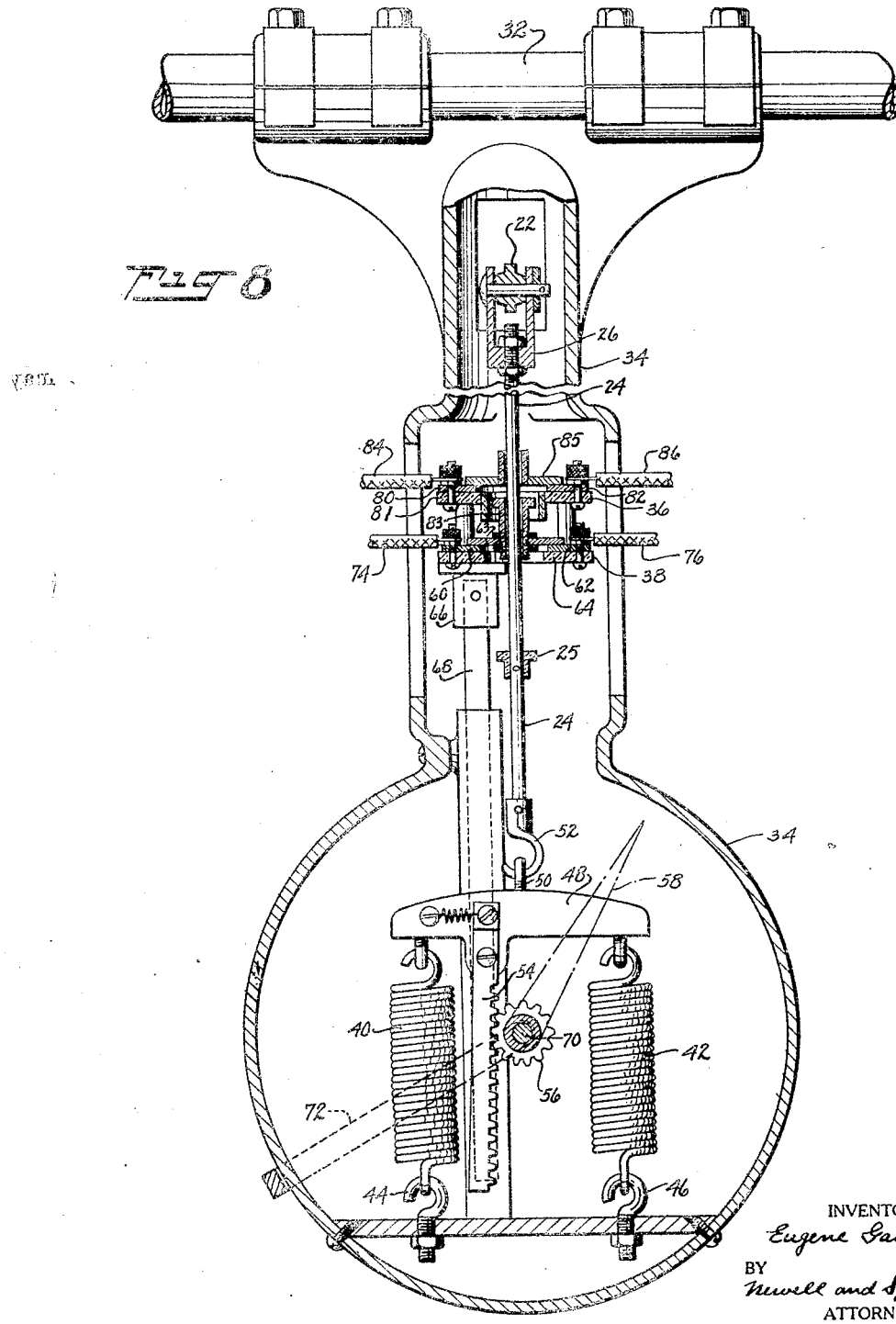

Patented Jan. 19, 1926.

1,570,300

UNITED STATES PATENT OFFICE.

EUGENE GASE, OF SAGINAW, MICHIGAN, ASSIGNOR TO BAKER-PERKINS COMPANY, INCORPORATED, OF WHITE PLAINS, NEW YORK.

WEIGHING MACHINE FOR LIQUIDS.

Application filed January 28, 1924. Serial No. 688,912.

To all whom it may concern:

Be it known that I, EUGENE GASE, a citizen of the United States, residing at Saginaw, Michigan, have invented a certain new and useful Improvement in Weighing Machines for Liquids, of which the following is a clear, full, and exact description.

This invention relates to automatic weighing machines and more particularly to an automatic weighing machine for weighing out predetermined weights of liquid to be employed particularly for commercial operations, such as supplying water for the mixing of dough in commercial baking.

The primary object of the invention is to provide a weighing machine for the weighing of liquids, which may be automatically operated by electrical means in a manner such as to require little supervision or attendance, and by means of which a high degree of accuracy may be attained in the weighing operation.

Another object of the invention is to provide a weighing machine for automatically weighing out liquids, in which the supply of liquid to the weighing tank or container may be automatically controlled in such a manner that a large quantity thereof may be rapidly supplied to the container in a short interval of time, and thereafter toward the end of the weighing operation, at a decreased rate whereby the accuracy in weighing out a predetermined amount of the liquid may be greatly increased.

Another object of the invention is to provide an improved electrical means for operating valves to control the supply of liquids whereby positive actuation of the valves may be attained with certain predetermined movements of the weighing machine.

A further object of the invention is to provide a novel form of valve which is particularly adapted to control the flow of liquids and to by-pass the liquid remaining in the valve at the time of cut off.

With these and other objects in view, the invention comprises the features hereinafter described and particularly defined in the claims.

One feature of the present invention involves means for supplying a large quantity of liquid to the container of the weighing device during the greater portion of the time that liquid is supplied thereto, and thereafter supplying liquid at a reduced rate until the desired amount of liquid has been supplied to the container, and the supply has been automatically cut off. It is apparent that if liquid were supplied to the weighing device at the same rapid rate during the period of supply, a large quantity of liquid would be in transit from the supply pipe to the weighing tank at the time of cut off after the desired amount of liquid would have been supplied to the container. This defect could be obviated, obviously, by supplying a liquid at a slow rate during the whole period of supply to the container and the amount of error in weighing would be minimized, but the period of supply would be so great that this method of supply would be entirely unsatisfactory. By the provision of means for first supplying liquid at a rapid rate to the device, and then, near the end of the supply period, greatly reducing the supply rate so that only a small quantity is supplied in a unit of time, the inaccuracy, due to the transit of liquid to the container after cut-off has taken place, may be made very small, or may be substantially eliminated.

Another feature of the invention which serves to increase the accuracy in the weighing operation is a means for passing to waste the greater portion of liquid which is in transit at cut-off from the control valve to the container or in other words, to by-pass the liquid contained in the outlet side of the valve at the end of the weighing operation. The amount of liquid which is unavoidably supplied to the container after the cut-off has taken place, with the means which I have provided, is a very definite amount with any given rate of supply, and may be compensated for by the proper setting of the counterweight or counterweights of the scale beam, so that the final weight to be attained may be very accurately controlled.

The means which I have provided for automatically operating the control valves of the device, comprise solenoids which are operatively attached to the valves and which are in circuit with switches which may be automatically opened by a mechanism dependent in operation on movements of the scale beam or weighing device. To accomplish this result, I preferably employ switches which may be positioned in proximity to the weighing rod, suspended from a scale beam, and opened during the upward movement of the weighing rod by suitable actuating means attached thereto, which is adapted to operate when the weight of liquid supplied to the container reaches a predetermined amount. By this means the supply of liquid to the weighing tank or container may be accurately controlled, as will be more fully hereinafter described.

The various features of the invention are illustrated in the accompanying drawings showing a preferred form of the invention, in which:

Fig. 2 is a view in elevation of a portion of the apparatus showing the manner of supporting the weighing tank on knife edges, and showing the supply pipes and the position of the valves therein which are operated by solenoids to control the supply of liquids to the tank;

Fig. 3 is a detail view of the control valve or double-acting valve showing the passages for the entrance of liquid thereto and for the escape of liquid therefrom;

Fig. 4 is a cross-sectional view on a reduced scale taken on the line 4—4 of Fig. 3;

Fig. 5 is a cross-sectional view on the same scale as Fig. 4 taken on the line 5—5 of Fig. 3;

Fig. 6 is a cross-sectional view on the same scale as Fig. 4, taken on the section line 6—6 of Fig. 3;

Fig. 7 is a cross-sectional view on the same scale as Fig. 4, taken on the line 7—7 of Fig. 3;

Fig. 8 is a cross-sectional view of the dial mechanism and switch mechanism for breaking the circuits to the solenoids; and Fig. 9 is a wiring diagram showing a suitable method of connecting the switches and solenoids in circuit with a source of power whereby the solenoids may be independently operated.

Figure 1:
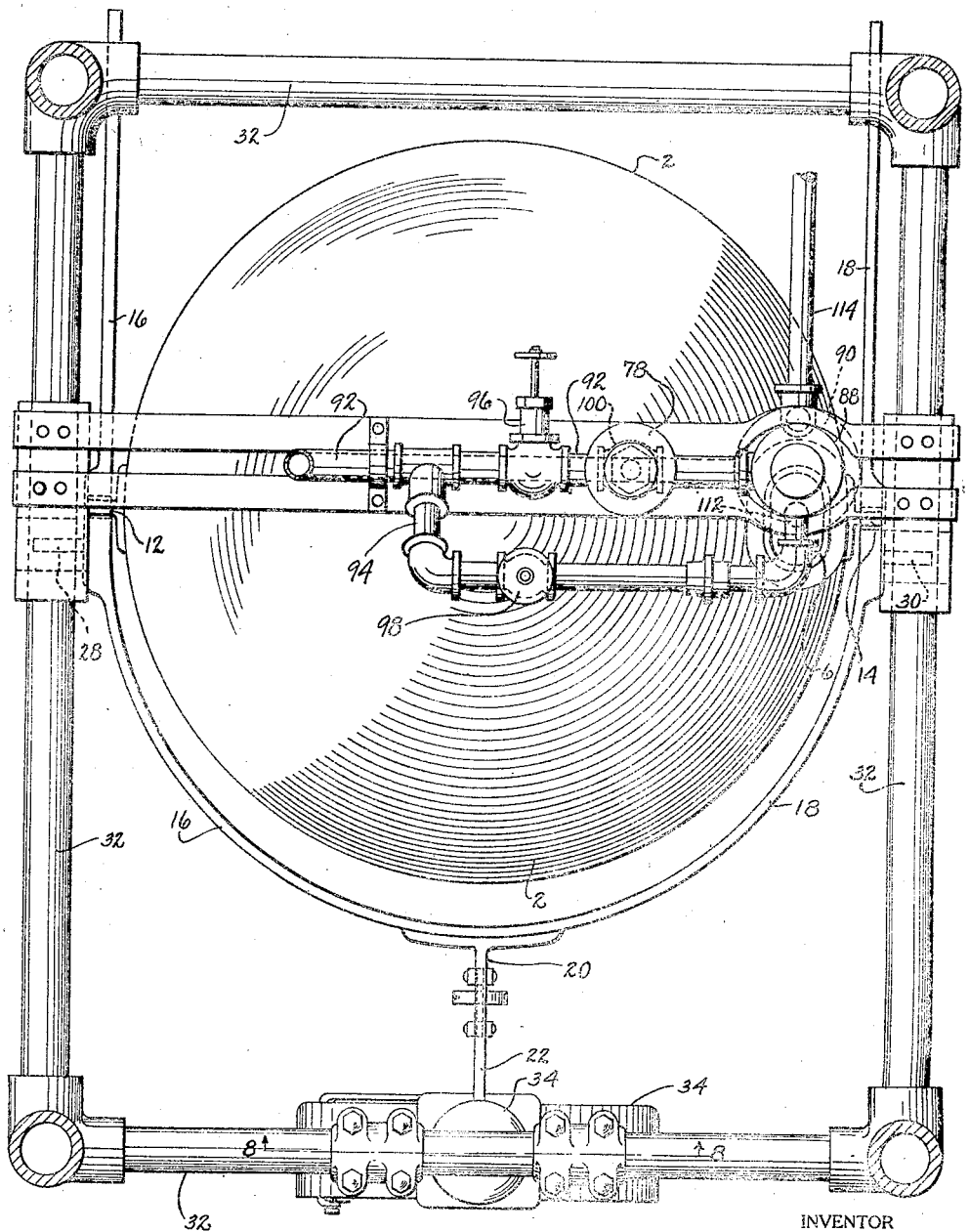
Figure 1 is a plan view of the weighing machine showing the means for supporting the weighing tank, also the supply pipes for leading liquid thereto and control valves in the pipes.

Referring more in detail to the drawings, 2 designates a tank or container which is adapted to hold the liquid which is to be supplied thereto in certain predetermined amounts. The tank 2 is preferably provided with a cover 4 in which is an opening 6 through which liquid may be supplied to the tank from a suitable pipe leading thereto from the source of supply. The bottom of the tank is preferably conical in form so that liquid may be easily drained from the tank through an outlet pipe 8, having a valve 10 therein. The tank 2 is suspended by means of knife edges 12, 14, suitably attached to the tank, which rest upon the branches 16, 18 of a scale beam 20. The stem or forward part 22 of the scale beam is suitably attached to the weighing rod 24 by a link 26, for example, which may be adjusted in position so as to attain the correct zero reading of the weighing apparatus. The scale beam 20 is provided with the knife edges 28, 30, attached respectively to the branches 16, 18 thereof, which serve as a fulcrum of the balance. The knife edges 28, 30 are suitably supported upon bearings fixed on a framework 32, which may be suspended from the ceiling in which the machine is placed, or may be supported in any other suitable way.

The weighing rod 24 is preferably mounted within a casing 34, which may be attached to and supported by the framework 32, and within which are also mounted the switches 36, 38, by means of which the solenoids connected to the control valves in the supply pipe are operated.

Connected to the lower end of the weighing rod 24, within the casing 34, are springs 40, 42, whose lower ends may be connected to the casing or to a bracket rigidly mounted therein by means of hooks 44, 46, and whose upper ends are preferably attached to a plate 48 to which the weighing rod is attached by means of hooks 50, 52, or other suitable connecting means. Pivotally supported upon the plate 48 is a rack 54 which is adapted to cooperate with a pinion 56 to which a pointer 58 is connected, whereby the pointer will be moved over a dial scale mounted upon the casing, when the weighing rod and the rack 54 operatively attached thereto are actuated during the weighing operation.

The switch 38, above referred to, comprises the conducting plates or terminals 60, 62, which may be mounted upon an insulating member 64 which is preferably attached to a bracket 66 to which a rod 68 is connected, and which may be elevated or lowered in position by a rack at the lower end of the rod 68, which may be in gear with a pinion on the shaft 70 upon which the pinion 56 is also mounted. An arm 72 is operatively connected to the pinion upon the shaft 70, so that, by rotating the arm, the switches 36, 38 may be raised or lowered so as to regulate the position at which cut-off of the control valves may take place, as will be more fully hereinafter described. Connected to the terminals 60, 62 are leads 74, 76, which are in circuit with the solenoid winding of a solenoid 78. Adapted to seat upon the terminals 60, 62 is a conducting plate 63, which is preferably in the form of an annular ring, through the central opening of which the weighing rod may oscillate without coming into contact therewith. In order to lift the conducting plate 63 out of contact with the terminals 60, 62, so as to break the circuit therethrough, I provide on the weighing rod 24 a lug or projecting portion 25, which when liquid is passed to the container 2, moves upwardly with the weighing rod and lifts the conducting plate.

The upper switch 36 similarly comprises terminals 80, 82 of any suitably conducting material, which are mounted upon a non-conducting member 81 which is in turn suitably mounted on or connected to the insulating member 64. Connected to the terminals 80, 82 are leads 84, 86 which are in circuit with the winding of a solenoid 88, which is operatively attached to the main control valve 90 in the liquid supply pipe by means of which liquid is passed to the tank 2. In order to open and close the circuit through the terminals 80, 82, I provide a conducting member 85, preferably in the form of an annular ring, through the central opening of which the weighing rod 24 is adapted to pass, and which is of sufficient diameter to permit it to rest in contact with the terminals, whereby a circuit therethrough is completed. Any suitable means may be provided for lifting the member 85 out of contact with the terminals, but I prefer to employ a tube 83, of insulating material, which is attached to and extends upwardly from the conducting member 63 so that the plate 85 will be moved out of contact with its switch terminals after the member 25 has lifted the plate 63 and moved upwardly a predetermined distance, depending upon the length of the tube 83. The combined weight of the members 63, 83 is small, but being multiplied with the ratio of the weighing arm to the weight arm, is generally an amount too large to be neglected. The error which would thus be introduced may be compensated for by suitable counterbalancing weights which may be placed on the tank 2, or on the weight arm of the balance In order to supply liquid to the tank 2, I employ a supply pipe 92 to which a branch pipe 94 is attached, having an internal diameter considerably less than that of the main supply pipe 92. The main supply pipe 92 and the branch 94 are connected to the inlet side of the valve 90, as shown in the drawing. In order to regulate the flow of liquid through the main pipe and the branch pipe, I preferably provide a valve 96 in the main supply pipe between the control valve 90 and the point at which branch pipe 94 is connected to the main pipe. Similarly, in the branch pipe 94 I provide a valve 98, by means of which the flow of liquid therethrough may be controlled. I also provide in the pipe 92, preferably between the control valve 90 and the valve 96, a cut-off valve 100 which is operatively attached to the core of solenoid 78 in such a manner that when the solenoid 78 is energized the valve 100 will be maintained in open position to permit passage of fluid through the pipe 92.

The control valve 90 comprises a double-acting valve in which, when the solenoid 88 connected thereto is de-energized, the main valve will be closed and at the same time an auxiliary valve will be opened to pass the liquid contained in the outlet side of the valve to waste instead of allowing this to pass into the tank 2. The double-acting valve is preferably constructed in sections, comprising a main section 102, provided at one side with an opening 104 communicating with the pipe 92. At the upper portion of the section 102 is an opening 106 which communicates with the branch pipe 94, through a casing 108 connected to the casing 102 at one end and to the solenoid 88 at the other end thereof. To the lower end of the section 102 is connected a section 110, which is provided at one side with a pipe 112 which serves as an outlet from the valve to pass liquid to the container 2 through the opening 6. At the other side of the section 110 is provided a pipe 114 serving as an outlet to pass liquid remaining in the valve 90 to waste, after the desired amount of liquid has been passed to the container during the weighing operation. Within the section 102 I provide a valve seat 116 which may be attached within the section in any suitable manner, such as by means of a screw-threaded connection 118, for example, by means of which it may be rigidly held in place. Adapted to seat upon the valve seat 116, is a valve 120 which may be constructed with a hollow cup portion 121 in which a valve rod 122, having a disk or projecting member 123 at the lower end thereof, may be retained by means of a collar or flange ring 124, provided with screw threads and adapted to be screwed into position within the cup member. By providing a sufficient clearance between the bottom portion of the cup member and the lower portion of the ring 124, the valve rod 122 may be flexibly held so as to permit a limited longitudinal movement thereof, when actuated by means of the solenoid 88, to whose core the rod is attached.

The main body of the lower section 110 of the double-acting valve 90 is preferably cylindrical in form, as indicated in Figs. 4, 5, and 6, whereas the lower portion thereof is preferably elliptical in cross-section, as shown in Fig. 7. Within the upper portion of the section 110 is an annular ring 126 (see Figs. 4 and 5) which may be made integral with the member 110, if desired, and provided at one side thereof with an opening 127 communicating with the pipe 112 so as to permit passage of liquid thereto. At the central portion of the annular member 126 is an opening 129 in which is provided a ring shaped valve seat 128 which may be attached by screw-threaded connections, or in any other suitable manner, to the member 126. Adapted to seat upon the member 128 is a valve 130 which comprises a cup member having an opening 132 at the lower side thereof, in which a flange plug or a screw-threaded closure 134 is adapted to be held. Connected to the lower end of the valve 120 is an auxiliary valve rod 136 which may be connected thereto by means of a pin 138 adapted to pass through the valve rod, and into a corresponding opening in a projection 140 at the lower end of the valve 120. The valve rod 136 passes through a central opening 142 in valve 130, and may be held in place by means of a suitable rod or pin 144. In order to prevent liquid from remaining in the hollow portion of the valve 130, I provide grooves 146 in the valve rod 136, at the lower end thereof, by means of which liquid may readily pass to and from the opening or space within the cup member of the valve 130. In order to limit the downward movement of the valve 130, I provide a closure 148 which may be held in position within the casing by means of screw-threaded connections, for example, by means of which the position of the closure member may be adjusted as desired.

The valves 120 and 130 and their corresponding seats 116 and 128 are so positioned with respect to each other within the valve that when the upper valve 120 is raised, by means of the rod 122, so as to permit passage of liquid through the main valve, the rod 136 is drawn upwardly until the cross pin 144 reaches the top of the opening within the valve 130, which serves to lift the valve and thereafter to bring it upwardly against the valve seat 128, thereby serving to close the outlet port leading to the pipe 114. The liquid passing through the main valve 130 then passes through the opening 127 in the section 126, and into the pipe 112, and passes into the container 2 through the opening 6.

The operation of the apparatus as a whole may now be described in detail.

When it is desired to automatically supply liquid to the tank 2, the switch or starting box 150 (see Fig. 9) is operated to close the circuit from the source of power 3 through the switches 36, 38, and through the corresponding solenoids 78, 88, to which the control valves in the supply pipes are connected. As soon as the solenoids are energized the corresponding valves 100 and 90 are opened, permitting liquid to flow through the main supply pipe 92 and also in smaller quantities through the branch pipe 94, leading to the inlet side of the main control valve 90. During the supply of liquid to the tank, the increase in weight serves to raise the weighing rod 24 against the force of the springs 40, 42, the instantaneous weight of the liquid supplied being indicated upon a dial scale by means of the pointer 58. The arm 72, having been put in a position corresponding to that at which it is desired to have final cut-off of liquid take place, the supply of liquid continues until at a predetermined point before the final cut-off is to take place, determined by the relative positions of the switches 36, 38, the conducting member 63 is raised out of contact with the terminals 60, 62 by means of the projection or lug 25 attached to the weighing rod. The circuit through the leads 74, 76 to the solenoid winding of solenoid 78 being broken, the solenoid is deenergized, releasing the core thereof and permitting the valve 100 attached thereto to close. The passage of liquid through the section of the pipe 92 between the branch pipe 94 and the valve 90 is thereby cut off and the liquid is fed thereafter at a reduced rate to the inlet side of the control valve 90 through the branch pipe 94. The supply of liquid through the branch pipe 94 continues thereafter until the conducting member 85 is lifted out of contact with the terminals 80, 82 by means of the tube or supporting member 83 attached to the conducting member 63. The circuit through the leads 84, 86 being thus opened the solenoid 88, whose winding is connected thereto, is deenergized, permitting the core of the solenoid, to which the valve stem 122 is connected, to drop, whereby the main valve 120 then seats upon the member 116 thus cutting off passage of liquid through the valve. During the closing movement of the valve 120, the valve 130 moves downwardly out of contact with its seat 128, whereby the liquid in the valve 90, between the seat 116 and the valve 130, which is in transit through the valve, passes through the port therein connected to the waste pipe 114. The amount of liquid which passes to the tank 2 after the closing of the valve 120 is substantially that which is in transit in the pipe 112 below the annular member 126, the exact amount depending upon the set of the valves 126 and 130. As this amount is substantially constant with any given size of apparatus and rate of flow through the branch supply pipe, this weight of liquid may readily be compensated for, by the addition of suitable counter weight to the scale beam, whereby an exceedingly accurate final weight of the liquid may be attained.

After the desired amount of liquid has been passed to the tank 2 and the operation of the apparatus is stopped, the liquid may be drawn from the tank through the pipe 8 by operating the valve 10, and the apparatus will then be ready for another weighing operation.

It is to be understood that the device which has been described constitutes the preferred form of the invention, and that various changes and modifications may be made therein, as will be apparent to those skilled in the art, without departing from the spirit or scope of the invention, as defined in the claims.

What I claim as new and desire to secure by Letters Patent is:

1. In a machine for weighing liquids, a balance, a weighing tank suspended from said balance for receiving liquid to be weighed, a main supply pipe and an auxiliary supply pipe for leading liquid to said weighing tank, a valve in said main pipe, a solenoid operatively connected to said valve to maintain said valve in open position when said solenoid is energized, a valve in said auxiliary pipe, a solenoid operatively connected to the last named valve to maintain the valve in open position when the last named solenoid is energized, electrical circuits connected to the said solenoids, and means actuated by movements of said balance to successively open the said circuits to de-energize the said solenoids, the said means causing the valve of the main pipe to first close and thereafter, when the required quantity of liquid has entered the said weighing tank, causing the valve in the said auxiliary pipe to close.

2. In a machine for weighing liquids, a balance, a weighing tank suspended from said balance for receiving liquid to be weighed, a main supply pipe, an auxiliary supply pipe branching off from said main pipe, a main valve, a housing containing said main valve and connected on the inlet side of the said valve to said main pipe and the said auxiliary pipe, and at the outlet side of said valve to a pipe adapted to lead liquid passing through said valve into the said weighing tank, a valve in said main pipe between the points of connection to said auxiliary pipe and said main valve, and automatic means for first closing said valve in the said main pipe and thereafter the said main valve.

3. In a machine for weighing liquids, a balance, a weighing tank connected to said balance for receiving liquid to be weighed, a main supply pipe, an auxiliary supply pipe having a smaller bore than that of said main pipe, a main valve, a housing for said main valve connected at the inlet side of said main valve to said main pipe and said auxiliary pipe, a feed pipe connected to said housing at the outlet side of said main valve and leading to said weighing tank, a waste pipe connected to said housing at the outlet side of said main valve, a valve in the said waste pipe, means for operatively connecting the last named valve to said main valve so as to maintain the waste pipe valve open when said main valve is closed and vice versa, a cut-off valve in the said main pipe, and means actuated by movements of the said balance to first close the said cut-off valve, and thereafter to close the said main valve.

4. In a weighing machine for automatically weighing out a predetermined weight of liquid, a weighing arm and a weight arm, a container supported upon said weight arm, a weighing rod connected to said weighing arm, a supply pipe adapted to deliver liquid to said container, a control valve in said supply pipe, a solenoid mounted in operative relation to said valve, the core of said solenoid being connected to said valve and adapted to hold said valve open when said solenoid is energized, a switch in circuit with the solenoid winding, said switch having fixed terminals and a movable contacting member adapted to contact with said terminals, means connected to said weighing rod for moving said contacting member out of contact with said terminals to break the circuit through said solenoid winding, whereby said core is released and said valve is closed, thereby cutting off the supply of liquid to said container, and means for adjusting the position of said fixed terminals relative to the said means connected to the weighing rod for opening the said switch or moving the contacting member out of contact with the said terminals, whereby cut-off of liquid supply may be attained when a predetermined amount of liquid has been supplied to the said container.

5. In a weighing machine for automatically weighing out a predetermined weight of liquid, a weighing arm and a weight arm, a container for liquid supported on said weight arm, a weighing rod connected to said weighing arm, a supply pipe connected to a source of liquid supply, a control valve connected to said supply pipe, an outlet connected to said supply pipe, an outlet connected to said control valve and adapted to supply liquid to said container, a waste pipe connected to said control valve, a valve adapted to close a port leading to said waste pipe, means for connecting said valve to said control valve, a solenoid connected to said control valve and adapted when energized to hold said control valve in open position and to hold said valve in said waste port in closed position, a switch in circuit with said solenoid, and means operated by movements of said weighing machine to open said switch and operate said solenoid, thereby closing said control valve and opening the said valve connected with said waste pipe, whereby when the desired amount of liquid has been passed to said container, the residual liquid will flow to waste.

6. In a weighing machine for automatically weighing out a predetermined weight of liquid, a weighing arm and a weight arm, a container supported on said weight arm, a supply pipe connected to a source of supply having a main pipe and a branch pipe, a control valve connected to said main pipe and branch pipe, an outlet pipe from said control valve adapted to supply liquid to said container, a waste pipe connected to said control valve, a solenoid operatively connected to said control valve, a second valve in said supply pipe between said control valve and said branch pipe, a solenoid connected to said second valve and adapted when de-energized to close said second valve and prevent passage of liquid therethrough, a switch in circuit with the last-named solenoid, a switch in circuit with the first-named solenoid, means operatively connected to the scale beam of the balance for consecutively opening said switches, whereby said last-named solenoid will operate first, cutting off supply of liquid through the portion of the main supply pipe between said control valve and said branch pipe, whereby liquid thereafter will be supplied through said branch pipe to said control valve, and thereafter when the switch in circuit with the first-named solenoid is operated the supply of liquid through said control valve will be entirely cut off and the liquid remaining in the control valve will be passed to waste.

7. In a device of the class described, a double-acting valve comprising two inlet ports, one of which is connected with a main supply pipe and the other with a branch supply pipe, a valve seat in said valve, a valve adapted to seat thereon, a valve stem connected to said valve and operatively connected to the core of a solenoid, an outlet pipe connected to the outlet side of said control valve, a second valve seat, a second valve adapted to seat thereon in a direction opposite to the closing movement of the first valve, a waste pipe connected to the outlet side of the last-named valve, means connecting the first and second-named valves to maintain said second valve in closed position when said first-named valve is in open position, thereby permitting passage of liquid through said outlet pipe in the open position of the first-named valve, means for energizing said solenoid to maintain said control valve in open position, whereby when said solenoid is de-energized said control valve will close and the second valve will open to permit escape of liquid to said waste pipe.

8. In a device of the class described, a control valve, a main conduit connected to the inlet side of said control valve, a valve in said main conduit, a branch conduit connected to said main conduit on the inlet side of said valve and connected to the inlet side of said control valve, means for automatically closing said valve, whereby passage to the inlet side of said control valve will remain open through said branch conduit, a main outlet, and a bypass therefrom connected to the outlet side of said control valve, a valve controlling admission to the said bypass, means for automatically closing said control valve, and means for simultaneously opening the valve in said bypass to permit liquid remaining in the outlet side of said valve to be passed therethrough to waste.

9. In a device of the class described, a control valve, a main conduit connected to the inlet side of said control valve, a valve in said main conduit, means for automatically operating said valve to open and close the passage through said main conduit, a branch conduit connected to said main conduit on the inlet side of said valve and connected to the inlet side of said control valve, whereby when said valve is operated to close the passage through said main conduit to said control valve, the passage from said main conduit through said branch conduit to the inlet side of said control valve will remain open, a main outlet in said control valve, a bypass connected to the outlet side of said control valve, a valve controlling admission to said bypass, means for operatively connecting said bypass valve with said control valve, whereby when said control valve is opened, the said valve controlling admission to said bypass will be closed to permit passage through the main outlet, and when the said control valve is closed, the said bypass will be open, and means in said outlet to direct the passage of fluid through said bypass in the closed position of said control valve.

10. In a device of the class described, a main valve, an auxiliary valve, means for maintaining said main valve in open position and simultaneously maintaining said auxiliary valve in closed position, a main outlet from said main valve, and an auxiliary outlet or bypass at the outlet side of said valve, said bypass being adapted to be opened and closed by said auxiliary valve with closed and opened positions of said main valve, and means for directing fluid in said main valve into said bypass when said main valve is moved into closed position.

11. In a device of the class described, a valve casing, a main valve in said casing, a bypass conduit in said casing, a valve adapted to control said bypass conduit, means for flexibly connecting the said valves, whereby when said main valve in the main conduit is opened, the valve controlling said bypass conduit will be closed, and when the main valve is moved into closing position, the valve controlling said bypass conduit will be opened before said main valve is entirely closed, thereby passing the fluid contained in the valve into said bypass.

12. In a machine for weighing liquids, a delivery tube having near its delivery end changing the direction of the stream a discharge valve at the point where the direction is changed, said discharge valve being located in the line of the main flow of the stream, and means for opening said valve to divert any liquid in the main stream when the machine has attained its predetermined load.

13. In a machine for weighing liquids, a main feed conduit, a delivery conduit out of axial alignment with said main feed conduit, a waste conduit in alignment with said main feed conduit, a valve adapted to cut off communication between said main feed conduit and said waste conduit whereby when said valve is closed the direction of flow of material from said main conduit is diverted into said delivery conduit, and means actuated by movement of the weighing machine for opening the said valve when the machine has attained its predetermined load.

Signed at Saginaw, Michigan, this 22nd day of January, 1924.

EUGENE GASE.

Certificate of Correction.

It is hereby certified that in Letters Patent No. 1,570,300, granted January 19, 1926, upon the application of Eugene Gase, of Saginaw, Michigan, for an improvement in " Weighing Machines for Liquids," an error appears in the printed specification requiring correction as follows: Page 5, lines 112 and 113, claim 5, strike out the words and comma " an outlet connected to said supply pipe,"; and that the said Letters Patent should be read with this correction therein that the same conform to the record of the case in the Patent Office.

Signed and sealed this 23d day of March, A. D. 1926.

[SEAL.]

M. J. MOORE,
*Acting Commissioner of Patents.*